United States Patent
Wanke et al.

(10) Patent No.: US 9,266,439 B2
(45) Date of Patent: Feb. 23, 2016

(54) MULTI-VOLTAGE ON-BOARD POWER SUPPLY SYSTEM FOR A MOTOR VEHICLE

(75) Inventors: Christoph Wanke, Mering (DE); Tomas Reiter, Munich (DE); Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 858 days.

(21) Appl. No.: 13/449,176

(22) Filed: Apr. 17, 2012

(65) Prior Publication Data

US 2012/0261982 A1    Oct. 18, 2012

Related U.S. Application Data

(63) Continuation of application No. PCT/EP2010/006174, filed on Oct. 9, 2010.

(30) Foreign Application Priority Data

Nov. 11, 2009    (DE) .......................... 10 2009 052 769

(51) Int. Cl.

| | |
|---|---|
| *B60L 1/00* | (2006.01) |
| *B60L 3/00* | (2006.01) |
| *H02G 3/00* | (2006.01) |
| *B60L 11/18* | (2006.01) |
| *H02J 7/14* | (2006.01) |
| *H02J 1/00* | (2006.01) |

(52) U.S. Cl.
CPC ............. *B60L 11/1816* (2013.01); *B60L 1/006* (2013.01); *B60L 11/1868* (2013.01);
(Continued)

(58) Field of Classification Search
CPC . B60L 1/006; B60L 11/1868; B60L 2200/12; B60L 2210/10; B60L 11/1816; Y02T 90/121; Y02T 10/7005; Y02T 10/7022; Y02T 10/7088; Y02T 10/7216; Y02T 10/92; Y02T 90/127; Y02T 90/14; Y02T 10/7066; H02J 7/1423; H02J 2001/008
USPC .......................................................... 307/9.1
See application file for complete search history.

(56) References Cited

U.S. PATENT DOCUMENTS 6,147,433 A * 11/2000 Reineke et al. .......... 310/316.03
6,384,489 B1 * 5/2002 Bluemel et al. ............. 307/10.1
(Continued)

FOREIGN PATENT DOCUMENTS

| DE | 102 47 523 A1 | 4/2004 |
|---|---|---|
| DE | 10 2007 002 025 A1 | 7/2008 |

(Continued)

OTHER PUBLICATIONS

International Search Report dated Oct. 21, 2011 (Two (2) pages).

*Primary Examiner* — Jared Fureman
*Assistant Examiner* — Esayas Yeshaw
(74) *Attorney, Agent, or Firm* — Crowell & Moring LLP

(57) ABSTRACT

In the case of a multi-voltage on-board power supply system for a motor vehicle having a hybrid or electric drive, comprising a dc-dc converter, by means of which a high voltage level having a higher direct-current voltage and at least a first energy storage device is connected to a low voltage level having a lower voltage and at least a second energy storage device, wherein the system comprises a charging interface for charging external devices, at least one converter phase of the dc-dc converter can be disconnected from the low voltage level and instead can be connected with the charging interface, and a third energy storage device can be connected to the charging interface in order to supply the third energy storage device with a lower voltage and permit a charging of the third energy storage device by the energy flow from the first energy storage device.

9 Claims, 1 Drawing Sheet

(52) U.S. Cl.
CPC .......... *H02J 7/1423* (2013.01); *B60L 2200/12* (2013.01); *B60L 2210/10* (2013.01); *H02J 2001/008* (2013.01); *Y02T 10/7005* (2013.01); *Y02T 10/7022* (2013.01); *Y02T 10/7066* (2013.01); *Y02T 10/7216* (2013.01); *Y02T 90/127* (2013.01); *Y02T 90/14* (2013.01)

(56) References Cited

U.S. PATENT DOCUMENTS

| | | | |
|---|---|---|---|
| 6,583,519 B2 * | 6/2003 | Aberle et al. | 307/10.1 |
| 6,693,368 B2 * | 2/2004 | Schumann et al. | 307/10.1 |
| 6,771,052 B2 * | 8/2004 | Ostojic | 323/266 |
| 7,420,352 B2 | 9/2008 | Kranz | |
| 7,477,040 B2 * | 1/2009 | Bolz et al. | 320/118 |
| 7,730,855 B2 | 6/2010 | Lemberger et al. | |

FOREIGN PATENT DOCUMENTS

| | | |
|---|---|---|
| DE | 10 2007 011 673 A1 | 9/2008 |
| WO | WO2004/095671 A2 | 11/2004 |

* cited by examiner

MULTI-VOLTAGE ON-BOARD POWER SUPPLY SYSTEM FOR A MOTOR VEHICLE

This application is a continuation of PCT International Application No. PCT/EP2010/006174, filed Oct. 9, 2010, which claims priority under 35 U.S.C. §119 from German Patent Application No. DE 10 2009 052 769.9, filed Nov. 11, 2009, the entire disclosures of which are herein expressly incorporated by reference.

BACKGROUND AND SUMMARY OF THE INVENTION

The invention relates to a multi-voltage on-board power supply system for a motor vehicle having a hybrid or electric drive, comprising a dc-dc converter, by means of which a high voltage level having a higher direct-current voltage different from ground and at least a first energy storage device is connected to a low voltage level having a lower voltage different from ground and at least a second energy storage device.

Such multi-voltage on-board power supply systems having dc-dc converters are known, in many cases, from the state of the art. A dc-dc converter can connect on-board energy supply systems of different voltages with respect to energy. For increasing the power density of the dc-dc converter and for increasing its current load capacity, dc-dc converters often have a multiphase configuration. Preferably, this is a parallel connection of several converter phases (which is assumed in the following). In the case of a staggered controlling of the power switches (by 360 degrees divided by the number of converter phases), the current ripples are superimposed on one another at the output terminals and bus capacitors, whereby component stress can be reduced particularly at the bus capacitors.

In the state of the art, multi-voltage on-board power supply systems are used, among other things, for increasing the peak capacity (for example, hybrid drive, electrification of accessories). These partial power supply systems are connected by efficient multi-voltage converters which typically have a multiphase configuration.

It is an object of the invention to cost-effectively expand the functionality of a multi-voltage on-board power supply system.

This object is achieved by a multi-voltage on-board power supply system according to claim 1. Advantageous embodiments and further developments of the invention are contained in the dependent claims.

In contrast to the providing of a separate charging set—in addition to the dc-dc converter—the invention leads to a reduction of expensive, heavy and voluminous components. The total costs can thereby be reduced and the required space can be minimized. In addition, weight and therefore fuel can be saved.

The functional and constructional integration of charge sets into a motor vehicle per se is known from the state of the art. As a result of the integration of a suitable charge set, external equipment, such as small electrorollers, can be charged in a practical manner in future motor vehicles, particularly city vehicles. The possibility of charging an external device in a motor vehicle on-board energy supply system represents a function that is extremely valuable to customers. The charge sets known from the state of the art frequently contain their own dc-dc converters by means of which the respective external device can be charged by the on-board energy supply system of the motor vehicle.

According to the invention, at least one converter phase of the dc-dc converter provided anyhow for the various voltage levels of the multi-voltage on-board power supply system is used for charging the external device.

For this purpose, a charging interface for charging external devices is provided in the case of the multi-voltage system. The multi-voltage system and particularly the dc-dc converter or its wiring are implemented such that at least one converter phase of the dc-dc converter can be disconnected from the low voltage level and instead can be connected with the charging interface. In addition, a third energy storage device—to be charged—is provided which preferably is a component of the external device and which can be connected to the charging interface. In the state connected to the charging interface, this third energy storage device is supplied with the lower voltage of the multi-voltage supply system, and a charging of the third energy storage device by the energy flow from the first energy storage device to the third energy storage device is thereby permitted.

The multi-voltage on-board power supply may be implemented particularly as a two-voltage on-board power supply system with exclusively one high voltage level and one low voltage level.

In the simplest case, the dc-dc converter is implemented in a single-phase fashion. The single converter phase of the dc-dc converter can then be disconnected from the low voltage level and can instead be connected with the charging interface.

According to a preferred embodiment of the present invention, however, the dc-dc converter comprises several parallel-connected converter phases. It can then preferably be operated in at least a first and a second operating mode. In the first operating mode, all converter phases of the dc-dc converter are connected with the second energy storage device, and no converter phase is connected with the charging interface. The dc-dc converter will then be available exclusively for the voltage conversion between the high voltage level and the low voltage level. In contrast, in the second operating mode, at least one converter phase of the dc-dc converter is connected with the second energy storage device, and at least one other converter phase of the dc-dc converter is connected with the charging interface. The converter phases of the dc-dc converter are therefore partly utilized for charging the third energy storage device but also partly continue to be available for the voltage conversion between the high voltage level and the low voltage level.

In order to reduce component stress, particularly for a bus capacitor optionally connected on the part of the high voltage level parallel to the first energy storage device, the converter phases can be controlled in a staggered manner in the second operating mode.

The lower voltage (low voltage level) preferably is an on-board power supply system of approximately 12 volt that is typical of motor vehicles. The high voltage level is preferably connected with a traction battery of the motor vehicle or of the hybrid or electric drive of the motor vehicle.

The above-mentioned disconnecting of a converter phase from the low voltage level and its connecting with the charging interface can preferably be carried out by a single electronically controllable switching element. The operating modes can thereby be changed particularly easily, and the change-over can take place in a synchronized manner.

If the dc-dc converter comprises more than two converter phases, by means of suitable switch-over devices, a variable division of the total performance of the dc-dc converter between the "tasks" of the dc-dc conversion and the charging of exterior devices can be made possible. Thus, for example, when N converter phases are present, optionally one converter phase or two converter phases or up to (N−1) converter phases can be geared toward the charging of external devices, while the remaining converter phases will continue to be available for the dc-dc conversion.

The switch-over devices (possibly implemented as a single electronically controllable switching device) for disconnecting at least one converter phase from the low voltage level and for connecting it with the charging interface, are preferably integrated together with the converter phases of the dc-dc converter into an equipment component or into a housing. In addition, possibly provided bus capacitors are preferably also integrated into this equipment component or into this housing.

The charging interface is preferably constructed as a plug contact or as a switch. An external device can particularly easily be connected to a plug contact. In particular, a possible plug contact preferably has a standardized charging socket compatible with an external device that is standardized with respect to its charging plug.

According to a preferred embodiment of the present invention, a connecting of a third energy storage device to the charging interface can be detected and, as a function of this detection, the disconnecting from the low voltage level and the connecting with the charging interface can be automatically controlled. In particular, preferably the above-mentioned switch-over devices (especially if they are constructed as a single electronically controllable switching element) can be controlled as a function of this detection. The change of the operating modes can then take place automatically as soon as an external device to be charged is connected to the charging interface.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
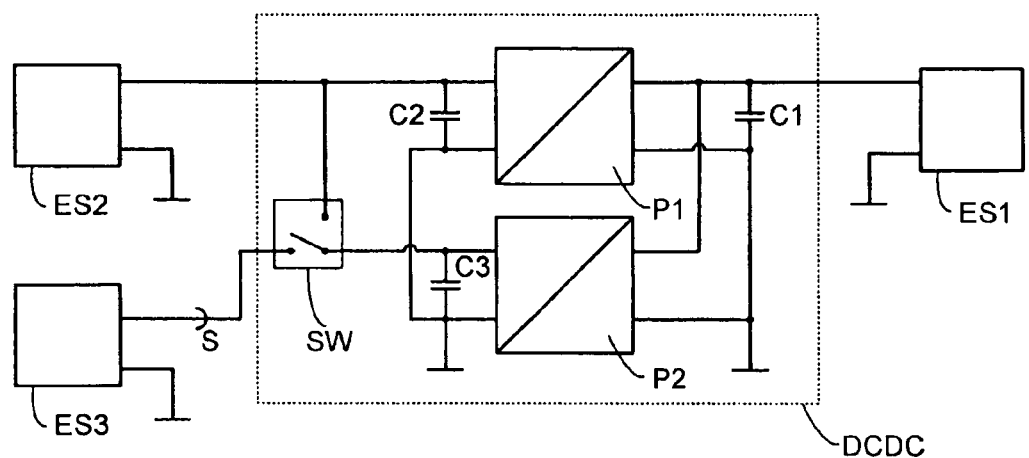
FIG. 1 is a schematic view of an implementation of the invention on the basis of a multiphase dc-dc converter.

A motor vehicle described in the following is constructed as a hybrid or electric vehicle, has a two-voltage on-board power supply system with a high voltage level (traction battery) and a low voltage level (12 volt) and comprises a dc-dc converter between the high voltage level and the 12-volt on-board power supply system.

The dc-dc converter can be operated in different operating modes.

A first operating mode (M1) means the following: Dc-dc conversion from high voltage to 12 volt for supplying the on-board power supply system from the traction battery, or from the high voltage system.

A second operating mode (M2) means the following: Charging of an on-board device (when the motor vehicle is standing or traveling) by means of switching the dc-dc converter over to a charging operating mode.

In the case of the dc-dc converter described here, the first and the second operating mode can advantageously be combined in a third operating mode (M3). Here, it is assumed that the dc-dc converter comprises several converter phases by means of which it (especially in the first operating mode M1) causes the dc-dc conversion between the high voltage level and the low voltage level. In this case, the above-mentioned switch-over of the dc-dc converter to a charging operating mode is limited to a few of these converter phases. A first portion of the converter phases then carries out the dc-dc conversion according to mode M1; the remaining portion of the converter phases then carries out the charging according to mode M2. In this case, the dc-dc performance decreases in comparison to a "pure" mode M1 in favor of the charging performance.

When the switch-over devices are designed correspondingly, the number of converter phases, which are used in Mode M3 for the charging operation, can be varied. To what extent the dc-dc performance in mode M3 is reduced in favor of the charging performance can be controlled by a corresponding division of the converter phases or definition of the mentioned number. While N converter phases are present, between one and (N−1) converter phases are used in mode M3 for charging the external device.

In principle, the switch-over devices can also be further developed such that, furthermore, a complete switch-over of the dc-dc converter (i.e. all converter phases) to a pure charging operation (mode M2) remains possible.

The arrangement required for the implementation of the combined mode M3 is created by modifying a conventional multiphase dc-dc converter such that, on the one hand, suitable switch-over devices are provided for disconnecting individual converter phase from the low voltage level and for their connection with a charging interface, and that, on the other hand, the switch-over/disconnection is implemented according to the mentioned operating modes (at least M1 and M3, possibly also M2) in software, and the switch-over devices are controlled correspondingly.

The hardware expenditures for the parallel or isochronous fulfilling of the two "tasks" of the dc-dc conversion and the charging of external devices are clearly lower in the case of such a system than when two separate devices (conventional dc-dc converter for the on-board supply system and separate charging device) are provided in one or also in two housings.

If no charging operation is required, a supporting of the 12-volt on-board power supply system can thereby take place, and the dc-dc converter can therefore be relieved.

If required, a special further development of the charging device phases for voltages higher than 12 volt is conceivable.

FIG. 1 illustrates a dc-dc converter which is constructed as a multiphase converter with a first phase P1 and a second phase P2, in which case the phases can be separated by means of a switch SW on at least one side. The converter is connected with on-board energy supply systems which typically contain energy storage devices. In the present example, ES1 represents an energy storage device in the high voltage on-board supply system; ES2 represents an energy storage device in the low voltage on-board supply system. A third energy storage device ES3 can be separated from the dc-dc converter by means of a plug contact or switch S. This third energy storage device ES3 is part of an external device (for example, an electroroller) and is to be charged in a mode M3 of the dc-dc converter.

As soon as the external device ES3 is connected by way of the plug connector S, the multiphase converter dc-dc is separated by the switch SW. There will then be two separate converter phases P1 and P2. The energy transfer from ES1 to ES2 can be continued in a reduced manner (only while still using P1). ES3 can be charged from ES1 (by using P2).

The inputs/outputs of the converter phases are connected with bus capacitors. On the part of ES1, a bus capacitor C1 is connected parallel to ES1. A bus capacitor C2 is (independently of the switch position of switch SW) connected parallel to ES2. A bus capacitor C3 is optionally connected parallel to ES2 (when connecting ES2 with P2) or is connected parallel to ES3 (when connecting ES3 by way of S with P2).

By means of a staggered controlling of the converter phases, the component stress in the bus capacitor C1 can be reduced.

When the device ES3 is not connected to S, the dc-dc converter is preferably again connected to form a multiphase converter (compare mode M1); i.e. ES2 is again connected with P2. The energy transfer ES1 to ES2 will then be possible again by means of the full converter performance. In addition, by means of a staggered controlling, the component stress in this operation is reduced in all bus capacitors.

The described configuration also has the advantage that the partial on-board supply systems ES1 and ES2 can be supported by means of the additional energy storage device ES3. It is conceivable, for example, to charge ES1 from ES2 with constant currents in order not to transiently stress ES2. For reducing fluctuating voltages in system ES1 (for example, triggered by transient high-performance consuming devices), the transient demand can be completely or partially met from ES3.

Figure 2:
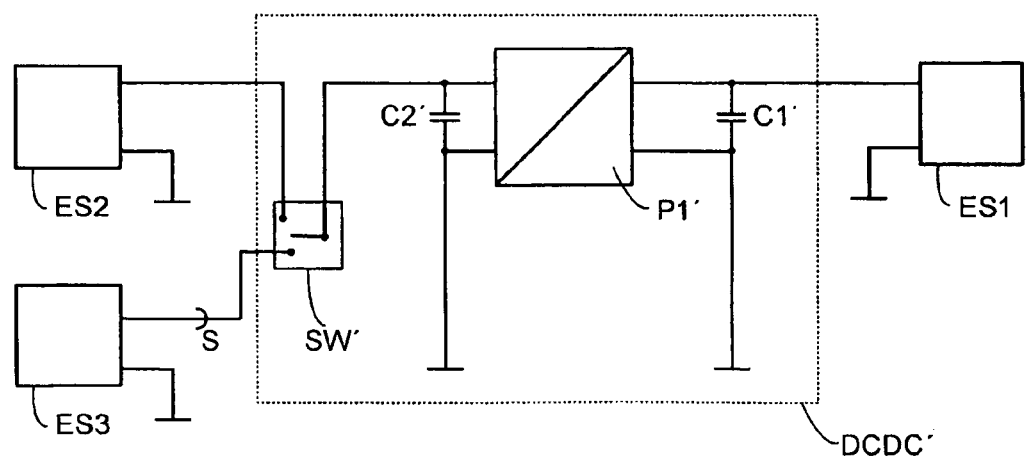
FIG. 2 is a schematic view of the implementation of the invention on the basis of a single-phase dc-dc converter.

FIG. 2 illustrates a single-phase dc-dc converter' with only one phase P1'. By means of a switch SW', the single converter phase P1' can optionally be used for the dc-dc conversion (when connecting ES2 with P1') or for the charging of an energy storage device ES3 connected to the charging interface S (when connecting ES2 by way of S with P1').

The invention permits an optimal utilization of installation space and a minimization of weight. The use of two devices required according to the state of the art (a conventional dc-dc converter for on on-board power supply system and a separate charging device) is cost- and space-intensive, even if both devices are integrated in one housing.

The invention eliminates different efficiency deficits of the state of the art: based on the recognition that, on the one hand, even if a charging interface is provided in the case of a motor vehicle, external devices are relatively rarely charged at this charging interface—which is why a converter exclusively provided for charging purposes, as a rule, is only slightly utilized—and that, on the other hand, the full performance capacity of a possibly multi-phase converter is only rarely utilized for connecting the partial on-board power supply systems of a modern multi-voltage on-board power supply system, comparable components are provided only singly and are used jointly for the two different purposes in a targeted manner. This also increases the cost effectiveness.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multi-voltage on-board power supply system for a motor vehicle having a hybrid or electric drive, comprising a dc-dc converter, by means of which a high voltage level having a higher direct-current voltage different from ground and at least a first energy storage device is connected to a low voltage level having a lower voltage different from ground and at least a second energy storage device, wherein the multi-voltage on-board power supply system comprises:
   a charging interface for charging external devices;
   at least one converter phase of the dc-dc converter that can be disconnected from the low voltage level and instead connected to the charging interface; and
   a third energy storage device that can be connected to the charging interface in order to supply the third energy storage device in the connected state and permit a charging of the third energy storage device by the energy flow from the first energy storage device to the third energy storage device,
   wherein a connection of the third energy storage device to the charging interface can be detected and, as a result of this detection, the disconnecting of the low voltage level and the connecting to the charging interface can be automatically controlled.

2. The multi-voltage on-board power supply system according to claim 1, wherein the dc-dc converter has a single-phase configuration.

3. The multi-voltage on-board power supply system according to claim 1, wherein the dc-dc converter comprises several parallel-connected converter phases and can be operated in at least a first and a second operating mode,
   wherein, in a first operating mode, all converter phases of the dc-dc converter are connected with the second energy storage device, and no converter phase is connected with the charging interface, and
   wherein, in a second operating mode, at least one converter phase of the dc-dc converter is connected with the second energy storage device, and at least one other converter phase of the dc-dc converter is connected with the charging interface.

4. The multi-voltage on-board power supply system according to claim 3, wherein, in the second operating mode, the converter phases are controlled in a staggered manner.

5. The multi-voltage on-board power supply system according to claim 1, wherein the lower voltage is an on-board power supply system voltage of approximately 12 volt.

6. The multi-voltage on-board power supply system according to claim 1, wherein the disconnecting from the low voltage level and the connecting to the charging interface can be carried out by a single electronically controllable switching element.

7. The multi-voltage on-board power supply system according to claim 1, wherein the charging interface is constructed as a plug contact or switch.

8. The multi-voltage on-board power supply system according to claim 1, wherein the dc-dc converter and one or more switch-over devices utilized for the disconnecting from the low voltage level and for the connecting to the charging interface, are integrated in a common housing.

9. A multi-voltage on-board power supply system for a motor vehicle having a hybrid or electric drive comprising:
   a dc-dc converter configured with at least one converter phase in which a high voltage on-board supply system, which includes a first energy storage device, is connected to a low voltage on-board supply system that includes a second energy storage device, wherein the dc-dc converter includes a charging interface for charging external devices, and wherein the dc-dc converter is further configured to be disconnected from the low voltage on-board supply system and instead connected to the charging interface such that a third energy storage device that is connected to the charging interface is charged by energy flow from the first energy storage device,
   wherein a connection of the third energy storage device to the charging interface can be detected and, as a result of this detection, the disconnecting of the low voltage level and the connecting to the charging interface can be automatically controlled.

* * * * *